(12) United States Patent
Yoldjou et al.

(10) Patent No.: US 10,274,025 B2
(45) Date of Patent: Apr. 30, 2019

(54) CLUTCH COMPENSATION PISTON

(71) Applicant: FEDERAL-MOGUL SEALING SYSTEMS, Herdorf (DE)

(72) Inventors: Cem Yoldjou, Dusseldorf (DE); Erika Szele, Graz (AT)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 84 days.

(21) Appl. No.: 15/534,180

(22) PCT Filed: Oct. 14, 2015

(86) PCT No.: PCT/EP2015/073744
§ 371 (c)(1),
(2) Date: Jun. 8, 2017

(87) PCT Pub. No.: WO2016/091436
PCT Pub. Date: Jun. 16, 2016

(65) Prior Publication Data
US 2017/0335898 A1    Nov. 23, 2017

(30) Foreign Application Priority Data
Dec. 8, 2014  (DE) .................. 10 2014 225 143

(51) Int. Cl.
*F16D 13/69*    (2006.01)
*F16D 25/12*    (2006.01)
(Continued)

(52) U.S. Cl.
CPC ............ *F16D 25/12* (2013.01); *F16D 13/70* (2013.01); *F16D 21/06* (2013.01); *F16D 25/06* (2013.01);
(Continued)

(58) Field of Classification Search
CPC ......... F16D 2250/0069; F16D 2250/76; F16D 2250/0023; F16D 2300/08; F16D 13/385;
(Continued)

(56) References Cited

U.S. PATENT DOCUMENTS

| 4,970,945 | A | * | 11/1990 | Schmidt | .............. F16D 25/0638 |
| | | | | | 192/85.41 |
| 5,447,218 | A | * | 9/1995 | Tauvron | .................. F16F 15/32 |
| | | | | | 192/110 R |

(Continued)

FOREIGN PATENT DOCUMENTS

| DE | 10 2011 006029 A1 | 9/2012 |
| DE | 10 2013 012815 A1 | 5/2014 |

*Primary Examiner* — Jacob S. Scott
*Assistant Examiner* — Lillian T Nguyen
(74) *Attorney, Agent, or Firm* — Robert L. Stearns; Dickinson Wright, PLLC

(57) ABSTRACT

A balance module 10 for a clutch comprises a first annular piston part 11, a second annular piston part 12, which is arranged opposite the first piston part 11 in the axial direction and spaced therefrom, at least three spring elements 13 operating in the axial direction, which are arranged axially between the first 11 and the second piston part 12, and a sealing element 14 with at least one radially outwardly directed sealing lip 15, which is attached on the first piston part 11. The spring elements 13, the first 11 and the second piston part 12 are connected to one another in a loss-proof manner, in order to form an integral module 10.

9 Claims, 5 Drawing Sheets

(51) Int. Cl.
  *F16D 21/06* (2006.01)
  *F16D 25/06* (2006.01)
  *F16D 13/70* (2006.01)
  *F16D 25/0635* (2006.01)
  *F16D 25/10* (2006.01)
  *F16D 13/38* (2006.01)

(52) U.S. Cl.
  CPC ......... *F16D 25/0635* (2013.01); *F16D 25/10* (2013.01); *F16D 13/385* (2013.01); *F16D 13/69* (2013.01); *F16D 2021/0661* (2013.01); *F16D 2250/0023* (2013.01); *F16D 2250/0069* (2013.01); *F16D 2250/0076* (2013.01); *F16D 2250/0084* (2013.01); *F16D 2300/08* (2013.01)

(58) Field of Classification Search
  CPC ...... F16D 25/10; F16D 25/12; F16D 25/0635; F16D 13/70; F16D 2/06; F16D 2021/0661; F16D 13/69; F16F 15/00–15/32
  See application file for complete search history.

(56) References Cited

U.S. PATENT DOCUMENTS

2010/0275681 A1* 11/2010 Ritschel .............. G01M 13/022
                                                        73/115.04
2012/0190462 A1*  7/2012 Wahl ................. F16F 15/12326
                                                         464/68.1

\* cited by examiner

CLUTCH COMPENSATION PISTON

BACKGROUND

1. Technical Field

The present invention relates to a balance piston for a clutch, particularly for dual-clutch gearboxes of vehicles,

2. Related Art

Depending on the type, clutches in vehicles have one or more operating clutches, which actuate friction clutches, in order to control the power transmission as desired. In dual-clutch gearboxes for example, when changing gear, the clutches of the currently engaged gear and the gear to be engaged are alternately disengaged and brought into engagement. When starting up the vehicle, a gear is engaged from neutral, in that the friction clutch of the first gear is brought into engagement by means of the operating clutch.

Clutches furthermore have what is known as a balance piston for each friction clutch, which ensures that the non-actuated clutch is reset to the disengaged state. Usually, spring assemblies are used for this, which push the clutch back into the disengaged position when not actuated, by means of a corresponding restoring force. Piston parts form the interface between the spring elements and the operating piston to be reset and position the spring elements.

Furthermore, sealing elements are inserted into seals, particularly dual-clutch gearboxes. These seal movable parts of the clutch with respect to one another, for example in the case of oil bath clutches.

Known balance pistons of this type consist of separate parts which are not connected to one another. Each component fulfils only its specific function. The spring assemblies provide the restoring forces, the sealing elements take on the sealing function, and one or more piston Parts position the spring assemblies and form the be surfaces for the operating pistons to be reset.

The presence of individual parts makes mounting the corresponding clutch or the gearbox with the clutch more complicated and may lead to installation errors. Furthermore, it makes it more difficult to optimally adapt the components involved to one another. As no closed or sealed system can be provided in the case of unconnected individual parts, the individual parts are, until they are mounted, exposed to potentially damaging influences, such as for example dirt collection, mechanical damage or corrosion.

SUMMARY

The object of the present invention is therefore to provide a balance module for a clutch, which solves the previously mentioned problems or at least can minimize the disadvantages of the prior art.

According to a first aspect, a balance module for a clutch is provided, comprising:
 a first annular piston part;
 a second annular piston part, which is arranged opposite the first piston part in the axial direction and spaced therefrom;
 at least three spring elements operating in the axial direction, which are arranged axially between the first and the second piston part; and
 a sealing element with at least one radially outwardly directed sealing lip, which is attached on the first piston part;
 wherein the spring elements, the first and the second piston part are connected to one another in a loss-proof manner, in order to form an integral module.

Due to the integration of the previously separate individual parts in one module, the following advantages inter alia are achieved:

Installation is facilitated, errors for example in the mutual positioning of individual parts can no longer occur. The integral module can be designed as a compact unit. The balance module simultaneously fulfils the functions resetting, sealing and bearing surface. The balance module can preferably be designed as a closed space. As a result, the internal spring elements can for example be better protected from contamination, corrosion and damage, particularly if the balance module is not yet installed. Due to the integration of at least three component groups (piston parts, spring elements, sealing element), an optimum adaptation of the components in relation to one another is facilitated.

Because of the ring geometry of clutch and balance module, at least 3 coil springs are preferably to be provided, which are arranged substantially symmetrically over the circumference. The number of spring elements is preferably substantially greater however, in order to ensure a more uniform and more reliable power transmission.

According to an embodiment, the first piston part has a running surface section with a radially inner running surface, on which the at least one sealing lip bears in a sealing manner in the installed state of the balance module.

Conventional sealing elements do not seal at the balance piston itself, but rather at a different bearing surface of the clutch, i.e. the running surface of the sealing element is not a constituent of the balance piston. Due to this embodiment, in which the running surface is an integral constituent of the balance module, the following advantages inter alia can be achieved:

An improved adaptation of the partners, running surface and sealing element, is enabled. A closed, sealed system can be created by means of the sealing bearing of the sealing element on the running surface section of the second piston part, which system is better protected from external influences and damage—particularly before installation, but also during operation.

According to one embodiment
 the spring elements are connected in loss-proof manner both to the first and the second piston part; or
 the first and the second piston part are connected to one another in a loss-proof manner.

In each case, it must be ensured that the elements of the balance module are loss-proof such that an integral module results, the constituents of which do not detach from one another by themselves. This can take place in various ways. For example, the two piston parts may be connected to one another in such a manner that the spring elements located between them are likewise loss-proof, although the spring elements do not necessarily have to be connected to the piston parts. However, in this alternative also, the spring elements are at least connected to one of the piston parts in a loss-proof manner. Alternatively or additionally, the spring elements can be connected to both piston parts, i.e. the spring elements connect the piston parts, as a result of which the cohesion as an integral module can likewise be ensured.

According to an embodiment, in the non-installed state of the balance module, an axial space is present between the at least one sealing lip and the running surface section.

In the non-installed state, the spring force of the spring elements can act fully or the spring elements can be deflected to the maximum extent, as no counterpart surfaces prevent this. According to this embodiment, the running surface section is dimensioned in such a manner in terms of the axial length thereof, that in the case of undisturbed deflection of the spring elements, a gap is present between the sealing lip and the edge of the running surface section. By contrast, the balance module is compressed to such an extent in the axial direction in the installed state, that the sealing lip comes to lie on the running surface. It is possible in this manner to save material for the running surface section, without impairing the function during operation.

Furthermore, according to an embodiment, the edge or the running surface section, which is opposite the at least one sealing lip, is realized such that it is rounded, bevelled, angled or a combination thereof, so that the at least one lip can slide over the edge—during the installation of the balance module, in which the first and the second piston part are brought closer together under compression of the spring elements an the axial direction—in order to assume its installation position on the running surface of the running surface section.

According to this embodiment, the edge of the running surface section is configured in such a manner by means of one or more of rounding, bevelling or angling, that the sealing lip can slide over the same in as easy and resistance-free a manner as possible when the balance module is axially compressed for installation. The gap sent according to this embodiment between the running surface section and sealing lip in the non-installed state is reduced before or during the installation, until the sealing lip slides over the edge and assumes its installation position on the running surface.

According to an embodiment
 the running surface section has at least one locking element;
 the sealing element has at least one corresponding locking element; and
 in the non-installed state of the balance module, the first and the second piston part are connected in a loss-proof manner by means of the locking elements.

According to this embodiment, the sealing element can advantageously be used to ensure a loss-proof connection between the two piston parts. Preferably, the locking element on the side of the sealing element can additionally be a further sealing lip, alternatively, it is even possible that the primary sealing lip takes this on. Preferably, the locking element on the side of the running surface section can be a closed elevation or bead, so that even in the non-installed state, a good seal is achieved. Alternatively, corresponding projections or recesses can be provided, which fit into one another in such a manner in the non-installed state, that the piston parts are connected in a loss-proof manner.

According to an embodiment, the spring elements are connected to the first and/or the second piston part in a loss-proof manner by means of one or a combination of:
 welding;
 crimping;
 adhesive bonding; and
 latching.

According to an embodiment, the axial inner sides of the first and/or the second piston part have projections, to which the spring elements are connected in a loss-proof manner.

Particular preferably, the spring elements are secured on the piston parts by means by means of projections. For example, the elements can be spread or compressed at the axial end sides thereof, in order to engage over or into corresponding projecting elements. Preferably, the projections therefore have a substantially L-shaped cross section, which engages from the inside and/or from the outside in a positive fitting manner into the ends of the spring elements, in order to fasten the same in a loss-proof manner. This can according to the invention also be linked using crimping, for example in such a way that the projections are crimped together with the spring elements, or the projections are crimped around the spring elements.

According to an embodiment, the spring elements are coil springs. Coil springs are proven and reliable spring elements, alternatively however, any other elements can also be used, which can reliably apply a corresponding restoring force in the available volume.

According to an embodiment, the clutch is part of a dual-clutch gearbox, and the balance module as assigned to an operating piston of one of the clutches. It is possible to replace only one or even both or all of the balance pistons by the or a balance module according to the invention. Depending on the geometry of the dual-clutch gearbox, identically or differently constructed balance modules can be used in the process. For example, a balance module can have the integrated running surface, whilst a second balance module does not have the running surface for the sealing lip, for space reasons, and the sealing lip bears, and during operation runs, on a part of the clutch or gearbox housing.

DETAILED DESCRIPTION

Figure 1:
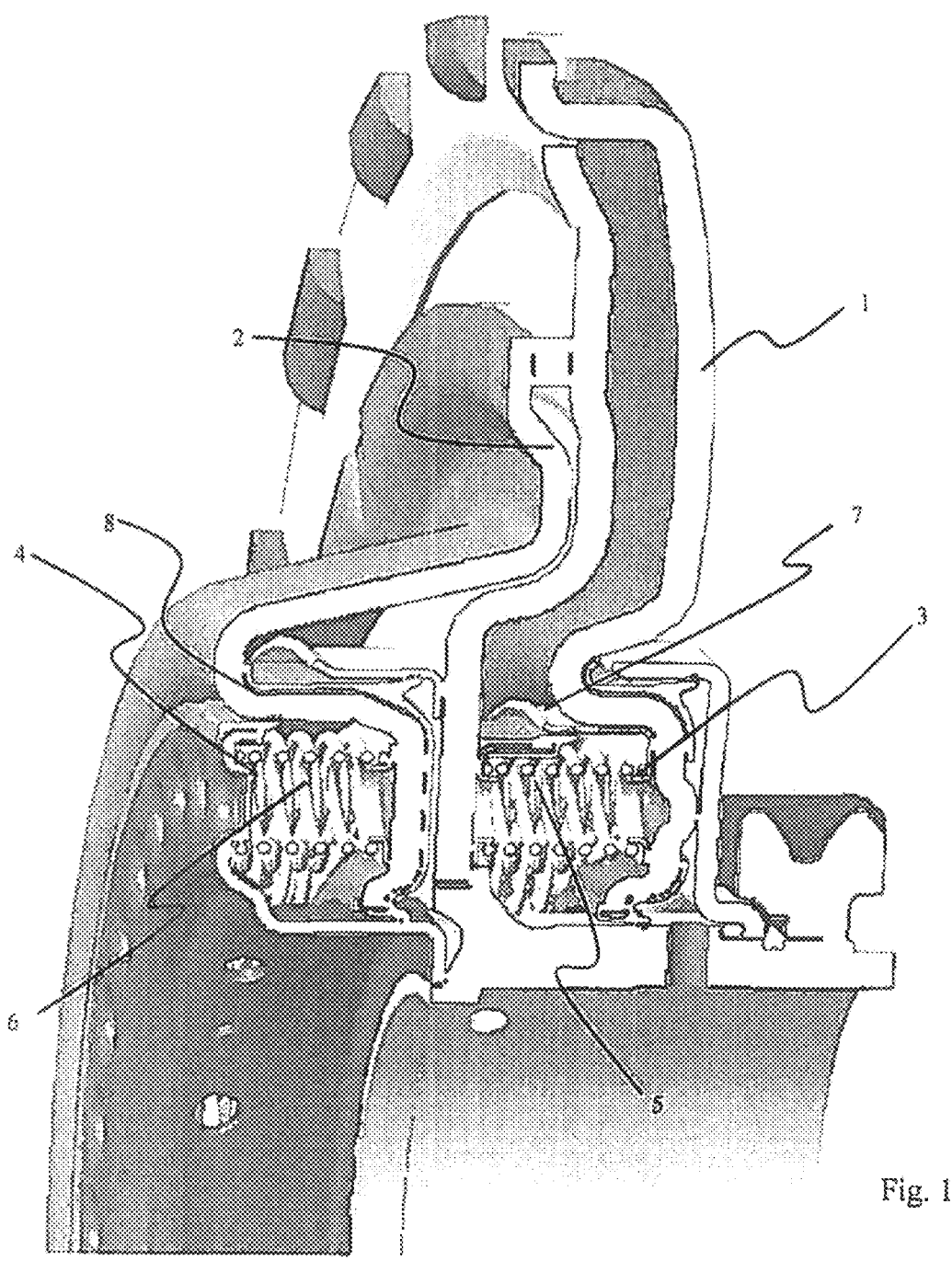
FIG. 1 shows a part of a dual-clutch gearbox in a three-dimensional sectional view.

A part of a dual-clutch gearbox is shown in a three-dimensional sectional view in FIG. 1. A first operating piston 1 is provided, in order to actuate a first friction clutch (not shown), which would be arranged radially further out on the left side in the figure. In the position shown, the operating piston 1 is located in the non-actuated or neutral position. A second operating piston 2 is provided, in order to actuate a second friction clutch (not shown), which would be arranged radially further in on the left side in the figure. In the position shown, the operating piston 2 is located in the non-actuated or neutral position.

In order to keep the respective operating piston 1, 2 in the neutral position, balance pistons 3 and 4 are furthermore provided. These comprise a set of spring elements 5 or 6 in each case. Furthermore, sealing elements 7, 8 are in each case present on the radial outer side. If the respective operating piston is pushed to the left, in order to actuate the friction clutch (not shown) into the engaged position, the respective spring elements are compressed and the sealing elements slide on the respective running surfaces (seen relatively, to the right). If the respective operating piston is no longer actuated, in order to separate the associated friction clutch, the spring elements push the operating piston back into its neutral position by means of their pre-stress, wherein the sealing elements slide back on the running surface.

Figure 2:
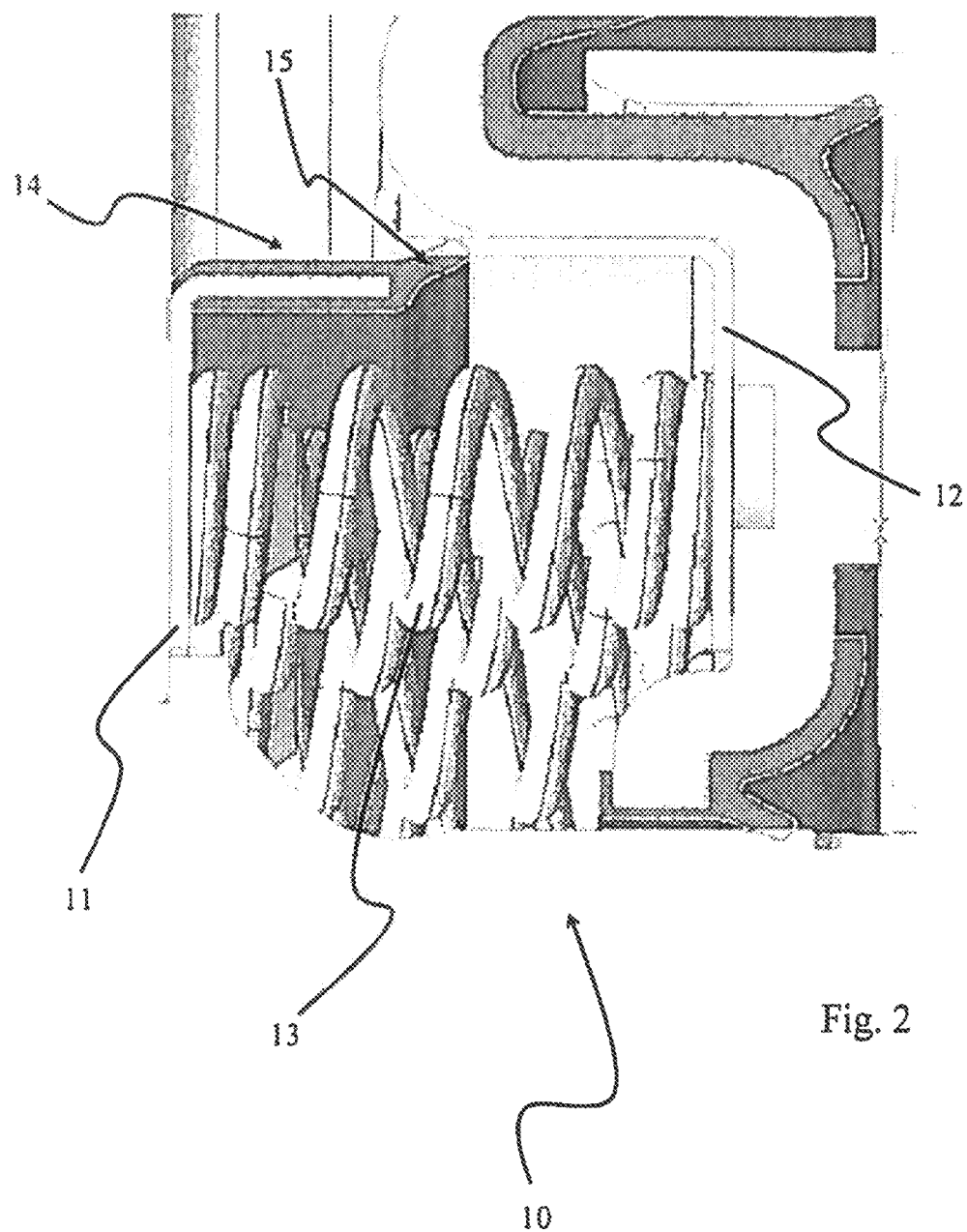
FIG. 2 shows a first embodiment of a balance module according to the invention in a three-dimensional sectional view.

FIG. 2 shows a first embodiment of the invention in a three-dimensional sectional view. A balance module 10 comprises a first piston part 11, a second piston part 12, a plurality of spring elements 13 and a sealing element 14 with a sealing lip 15. The elements 11-15 are connected to one another in a loss-proof manner, in order to form an integral balance module.

Figure 3:
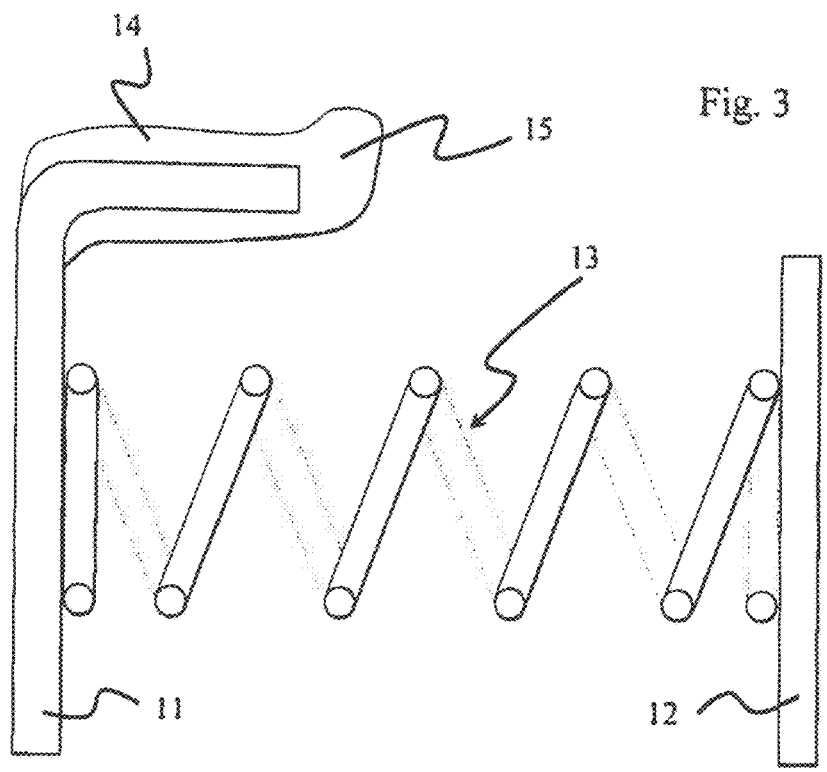
FIG. 3 shows a cross section of a second embodiment of the invention.

FIG. 3 shows a second embodiment of the invention in cross section. In this design, the first piston part 11 is constructed with an essentially L-shaped cross section. The spring elements 13 are in this design attached, for example welded or adhesively bonded, both on the first piston part 11 and on the second piston part 12 in a loss-proof manner.

The sealing element 14, for example an injection moulded elastomer sealing element is attached on the horizontally running leg of the L cross section. The sealing element 14 has a radially outwardly projecting sealing 15. The second piston part 12 has a strip-shaped cross section in this design. An axial gap is present between the sealing lip 15 and the edge of the piston part 12 opposite the sealing lip. The geometry shown here means that the sealing lip runs on a part of the clutch or the gearbox in the installed state. This embodiment, which can be provided for example for restricted spatial conditions, is suitable for example to replace the left balance piston in a gearbox as in FIG. 1.

Figure 4:
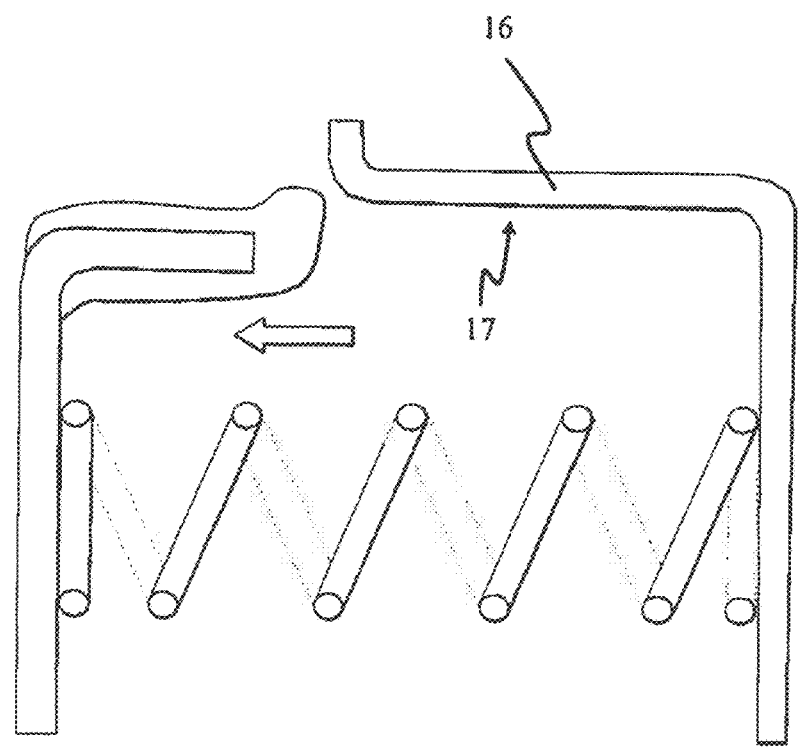
FIG. 4 shows a cross section of a third embodiment of the invention in the non-installed state.

FIG. 4 shows a third embodiment of the invention in cross section in a non-installed state, similar to the embodiment of FIG. 3. Compared to the embodiment of FIG. 3, this embodiment has a differently constructed piston part 12, however. The piston part 12 is here provided with a running surface section 16, which is here formed as a leg of an essentially L-shaped cross section. The non-installed state is shown in this figure, in which the spring elements 13 are deflected to such an extent compared to the installation state (indicated by an arrow), so that there is an axial gap between the sealing lip and the edge (which is here illustrated as angled) opposite the sealing lip.

This embodiment, which can be provided for somewhat more generous spatial conditions, is for example suitable to replace the right balance piston in a gearbox as in FIG. 1.

Figure 5:
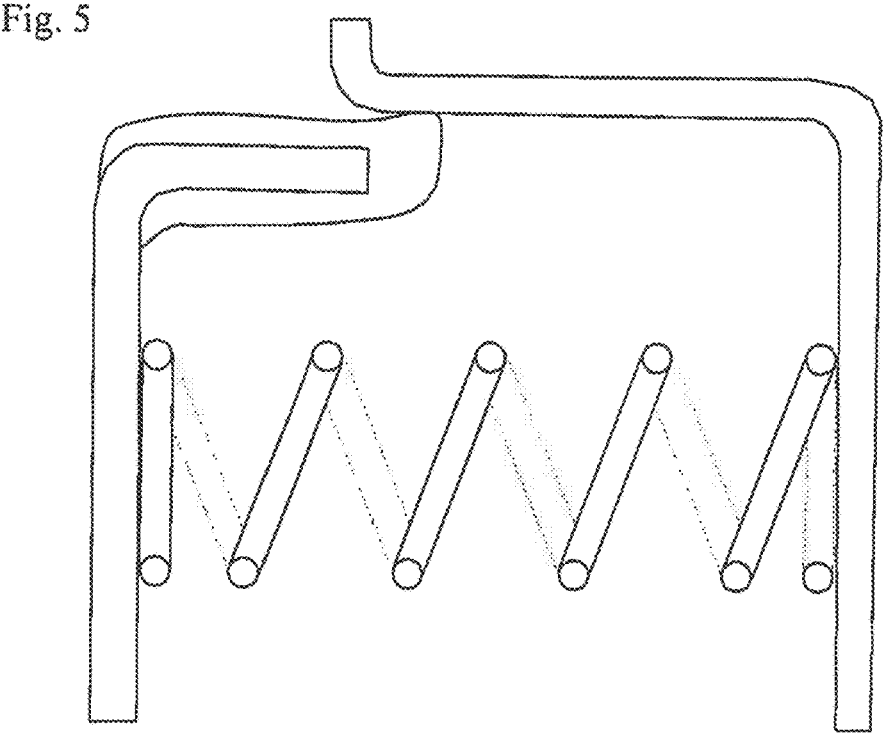
FIG. 5 shows a cross section of the embodiment of FIG. 4 in the installed and non-actuated state.

FIG. 5 shows the embodiment of FIG. 4 in the installed state, in the non-actuated position. Here, the spring elements 13 are compressed to such an extent by means of axial compression of the piston parts 11 and 12, that the sealing lip 15 has slid over the angled edge of the running surface section and bears on the running surface 17 of the running surface section 16. For this purpose, the edge of the running surface section 16 can preferably be configured in such a manner that this sliding over of the sealing lip is facilitated. This can take place by means of angling, bevelling, rounding or combinations thereof.

Figure 6:
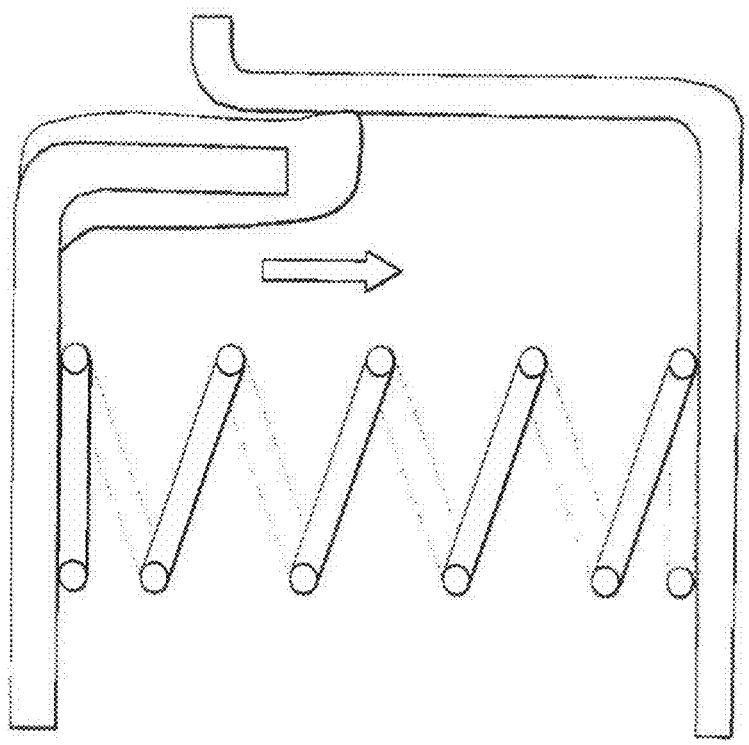
FIG. 6 shows a cross section of the embodiment of FIG. 4 in the installed and actuated state.

FIG. 6 shows the embodiment of FIG. 4 in the installed state, in an at least partially actuated position. Here, the spring elements 13 are compressed even further (indicated by an arrow) compared to the state shown in FIG. 5 by means of axial compression of the piston parts 11 and 12 owing to an actuation of the associated operating piston of the gearbox. The sealing lip slides over the running surface 17 in this case.

Figure 7:
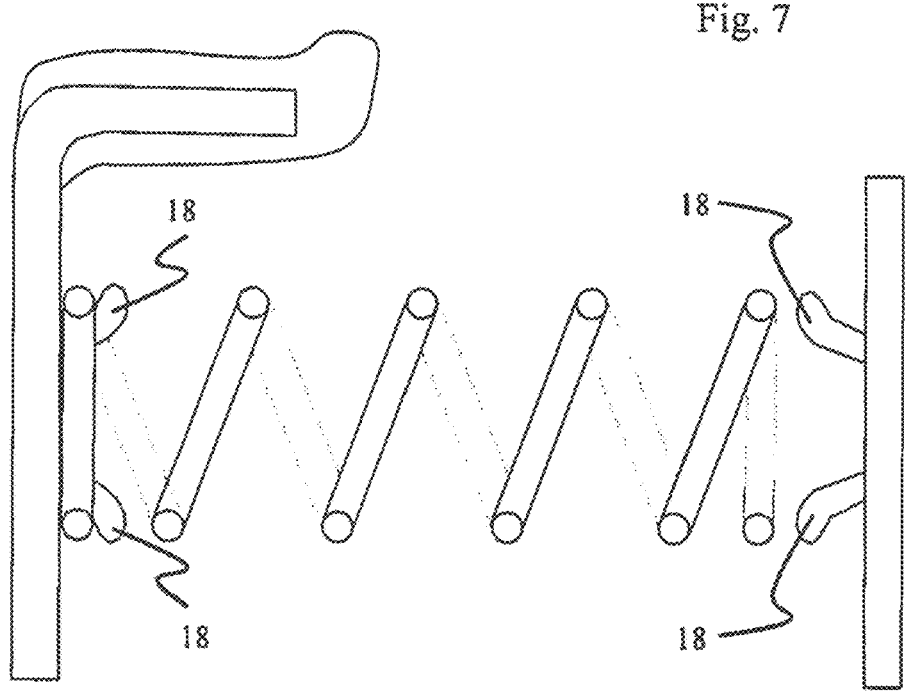
FIG. 7 shows a cross section of a fourth embodiment.

FIG. 7 shows a fourth embodiment similar to that of FIG. 3. Here, the design is shown, in which the spring elements 13 are fastened on the piston parts 11 and 12 by means of projections 18. As one can see on the left side of the, piston part 11, the projections 18 are configured in such a manner that they engage from the inside into the windings of the spring elements 13, here shown by way of example as coil springs, in order to fasten the spring elements in a loss-proof manner. The springs 13 can easily be attached on such projections 18 by means of spreading. Alternatively, the projections can conversely engage from the outside into the windings of the springs 13, wherein the springs can then be mounted by means of radial compression. On the right side on the piston part 12, the situation is shown with springs 13 not yet attached, so that the projections 18 can be seen.

Even if this type of fastening of the spring elements is preferred, other fastening types can also be used with the invention, including welding, adhesive bonding, crimping, hooking or the like. It is merely to be ensured in this case that the spring elements are connected in a loss-proof manner. Play may be present in this case, by contrast no play may be present in the case of alternative fastening methods such as welding, etc.

In embodiments analogous to those of FIG. 7, it is not necessary that the piston parts 11 and 12 are likewise connected. Alternatively, this is additionally likewise possible, however.

Figure 8:
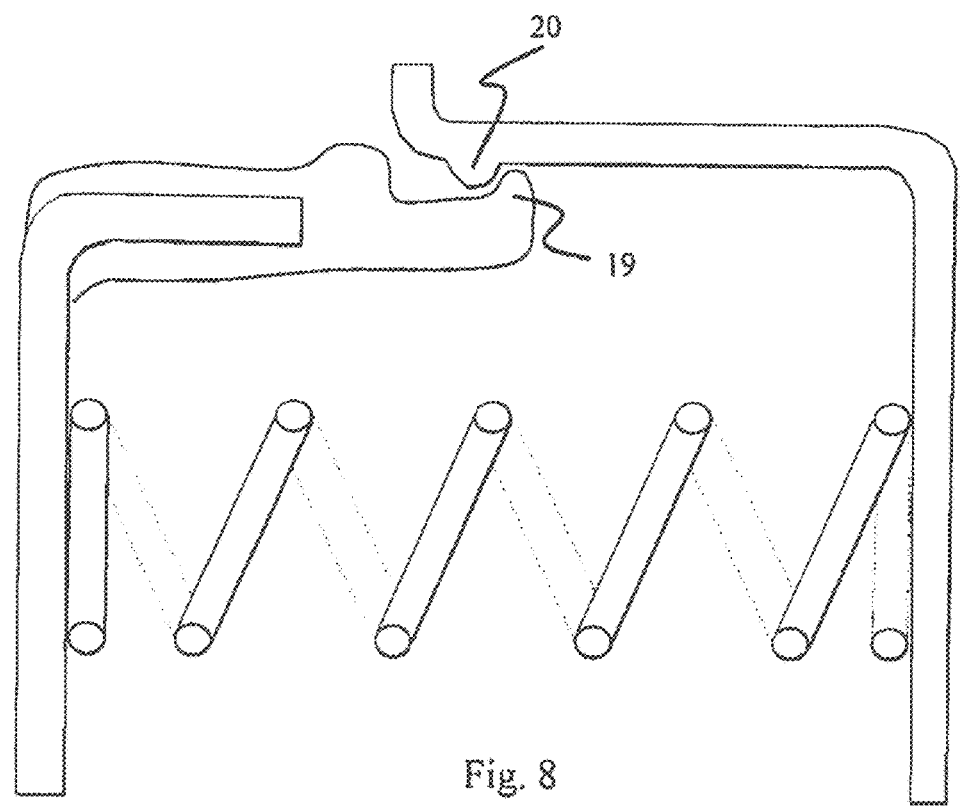
FIG. 8 shows a cross section of a fifth embodiment.

FIG. 8 shows a fifth embodiment in the non-installed state of the balance module. Here, there is no axial gap, this is a completely closed system. In this design, the first piston part 11 and the second piston part 12 are connected to one another in a loss-proof manner, as is explained in the following. It is therefore not absolutely necessary, but alternatively of course possible, that the spring elements 13 are connected to one or both piston parts.

A locking element 20 is provided on the running surface section 16, for example in the form of a circumferential elevation. A bead or embossment in the running surface section (not shown) would also be possible. A corresponding locking element 19 is provided on the sealing element, which engages behind the elevation 20 and thus holds the piston parts 11 and 12 together. Alternative designs with appropriate corresponding locking elements, such as depressions, projections and the like are likewise possible.

When installing the balance module shown here, the main sealing lip 15 will slide over the elevation 20 and come to lie on the running surface 17. It can then fulfil its sealing function. The locking element 19 can then be non-functional, but it can also preferably be configured as an additional sealing lip, however.

If it is ensured in this or other ways, that the spring elements are already held in the balance module by the loss-proof connection of the piston parts, it is not necessary in principle to fasten the spring elements on one or both piston parts in a loss-proof manner. Alternatively, this is of course nonetheless possible. It may however be enough to provide guides for the spring elements, which in their own right do not ensure loss proofing, but merely fix the positions of the spring elements in the radial direction.

The invention claimed is:

1. A balance module for a clutch, comprising:
   a first annular piston part;
   a second annular piston part, which is arranged opposite the first piston part in an axial direction and spaced therefrom;
   at least three spring elements operating in the axial direction, which are arranged axially between the first and the second piston part; and
   a sealing element with at least one radially outwardly directed sealing lip, which is attached on the first piston part;
   wherein the spring elements are connected to the first and/or the second piston part in a loss-proof manner by means of one or a combination of:

welding;

crimping;

adhesive bonding; and latching.

2. The balance module according to claim 1, wherein the first piston part has a running surface section with a radially inner running surface, on which the at least one sealing lip bears in a sealing manner in an installed state of the balance module.

3. The balance module according to claim 2, wherein in a non-installed state of the balance module, an axial space is present between the at least one sealing lip and the running surface section.

4. The balance module according to claim 3, wherein an edge of the running surface section, which is opposite the at least one sealing lip, is realized such that it is rounded, bevelled, angled or a combination thereof, so that the at least one sealing lip can slide over the edge during the installation of the balance module, in which the first and the second piston part are brought closer together under compression of the spring elements in the axial direction.

5. The balance module according to claim 2, wherein
   the running surface section has at least one locking element;
   the sealing element has at least one corresponding locking element; and
   wherein in a non-installed state of the balance module, the first and the second piston part are connected by means of locking elements.

6. The balance module according to claim 1, wherein
   the spring elements are connected both to the first and the second piston part; or
   the first and the second piston part are connected to one another in a loss-proof manner.

7. The balance module according to claim 1, wherein axial inner sides of the first and/or the second piston part have projections, to which the spring elements are connected.

8. The balance module according to claim 1, wherein the spring elements are coil springs.

9. The balance module according to claim 1, wherein the clutch is part of a dual-clutch gearbox, and wherein the balance module is assigned to an operating piston of one of the clutches.

* * * * *